United States Patent
Sugiyama

(10) Patent No.: US 7,679,515 B2
(45) Date of Patent: Mar. 16, 2010

(54) PROGRAM STORED IN MEDIUM READABLE BY COMPUTER FOR MEASURING OPTIMUM FEED AMOUNT TO RFID ANTENNA, FEED AMOUNT MEASURING METHOD, AND PRINTER HAVING RFID READ/WRITE FUNCTION

(75) Inventor: Makoto Sugiyama, Mishima (JP)

(73) Assignee: Toshiba Tec Kabushiki Kaisha (JP)

(*) Notice: Subject to any disclaimer, the term of this patent is extended or adjusted under 35 U.S.C. 154(b) by 1094 days.

(21) Appl. No.: 11/314,469

(22) Filed: Dec. 21, 2005

(65) Prior Publication Data
US 2006/0139662 A1 Jun. 29, 2006

(30) Foreign Application Priority Data
Dec. 27, 2004 (JP) ............................. 2004-376325

(51) Int. Cl.
G08B 13/14 (2006.01)
(52) U.S. Cl. ............... 340/572.4; 340/572.1; 340/10.1; 324/500; 438/156
(58) Field of Classification Search ............ 340/572, 340/10, 505; 324/500; 438/156
See application file for complete search history.

(56) References Cited

U.S. PATENT DOCUMENTS 6,019,865 A * 2/2000 Palmer et al. ............ 156/265

2006/0145859 A1 * 7/2006 Posamentier ............ 340/572.7

FOREIGN PATENT DOCUMENTS

| EP | 0 986 020 A2 | 3/2000 |
|---|---|---|
| EP | 2002/002026 | 6/2000 |
| EP | 1 422 656 A2 | 5/2004 |
| JP | 2001-096814 | 4/2001 |
| JP | 2003-296669 | 10/2003 |

OTHER PUBLICATIONS

Communication from Japanese Patent Office re: related application (and English translation).
Communication from European Patent Office re: related application.

* cited by examiner

*Primary Examiner*—Travis R Hunnings
(74) *Attorney, Agent, or Firm*—Harness, Dickey & Pierce, P.L.C.

(57) ABSTRACT

A program executed by a computer for measuring an optimum feed amount to an RFID antenna from a print standby position of a printer which reads and writes data from/on an RFID tag by feeding a label or tag containing an RFID tag, and then prints on the label surface by feeding the label or tag in the reverse direction, having step of performing a read/write test to the RFID tag whenever the label or tag is fed by a fixed amount from a print standby position, and a step of outputting the result of the read/write test visibly performed in the steps.

18 Claims, 5 Drawing Sheets

PROGRAM STORED IN MEDIUM READABLE BY COMPUTER FOR MEASURING OPTIMUM FEED AMOUNT TO RFID ANTENNA, FEED AMOUNT MEASURING METHOD, AND PRINTER HAVING RFID READ/WRITE FUNCTION

CROSS-REFERENCE TO RELATED APPLICATIONS

This application is based upon and claims the benefit of priority from prior Japanese Patent Application No. 2004-376325, filed Dec. 27, 2004, the entire contents of which are incorporated herein by reference.

BACKGROUND OF THE INVENTION

1. Field of the Invention

The present invention relates to a printer having an RFID read/write function with a built-in RFID read/write unit capable of reading and writing data in a noncontact manner.

2. Description of the Related Art

Generally, an RFID (Radio Frequency Identification) label or tag can be read and written in a noncontact manner by using a radio wave, and is significant as a technique substitutable for a barcode.

However, if a barcode reading system installed now in a shop is changed to an RFID applicable system, a current barcode cannot be read.

Thus, it becomes necessary to print a bar code and write data to an RFID tag. As a device to satisfy this need, a printer having the function of printing a barcode and writing an RFID on one tag has been known (Jpn. Pat. Appln. KOKAI Publication No. 2001-96814). This printer writes data on RFID by feeding a label in the label feeding direction, and prints a barcode on the surface of a label by feeding the label in the reverse direction.

For example, labels as shown in FIG. 2 and FIG. 3 are available for RFID. In FIG. 2, a reference numeral 11 denotes a liner, and 12 denotes a label. An RFID tag 13 is placed between the liner 11 and label 12. The RFID tag 13 is comprised of an RFID antenna 14 and an RFID chip 15.

Explanation will be given on writing data in the RFID chip 15 and printing on the label 12 by using a printer. When the print head of a printer is at the home position, the RFID chip 15 is displaced from the suitable position of the RFID read/write unit to write data. Thus, feed the label first, and move the RFID chip 15 from the FRID read/write unit to the suitable position, and write data on the RFID chip 15. Then, feed the label again to the position suitable for printing the label by the print head.

The position of burying the RFID chip 15 in the label 12 is different according to the kinds of RFID tag, and the amount of feeding the label in the label feeding direction is different when writing data on the RFID chip 15.

If the feed amount is not optimum, writing data in the RFID chip 15 and printing data on the label 12 may fail.

BRIEF SUMMARY OF THE INVENTION

It is an object of the present invention is to provide a program stored in a medium readable by a computer for measuring optimum feed amount to an RFID antenna capable of obtaining an optimum value of feeding an RFID label in a label feeding direction, a feed amount measuring method, and a printer having an RFID read/write function.

According to one aspect of the invention, there is provided a program stored in a medium readable by a computer for measuring an optimum feed amount to an RFID antenna from a print standby position of a printer which reads and writes data on/from an RFID tag by feeding a label or tag containing an RFID tag, and then prints on the label surface by feeding the label or tag in the reverse direction, comprising testing the RFID tag for reading/writing whenever the label or tag is fed by a fixed feed amount from a print standby position, and outputting the result of the read/write test visibly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Am embodiment of the present invention will be explained hereinafter with reference to the accompanying drawings. First, explanation will be give on the system configuration of a printer having the RFID read/write function with reference to the block diagram of FIG. 1.

Figure 1:
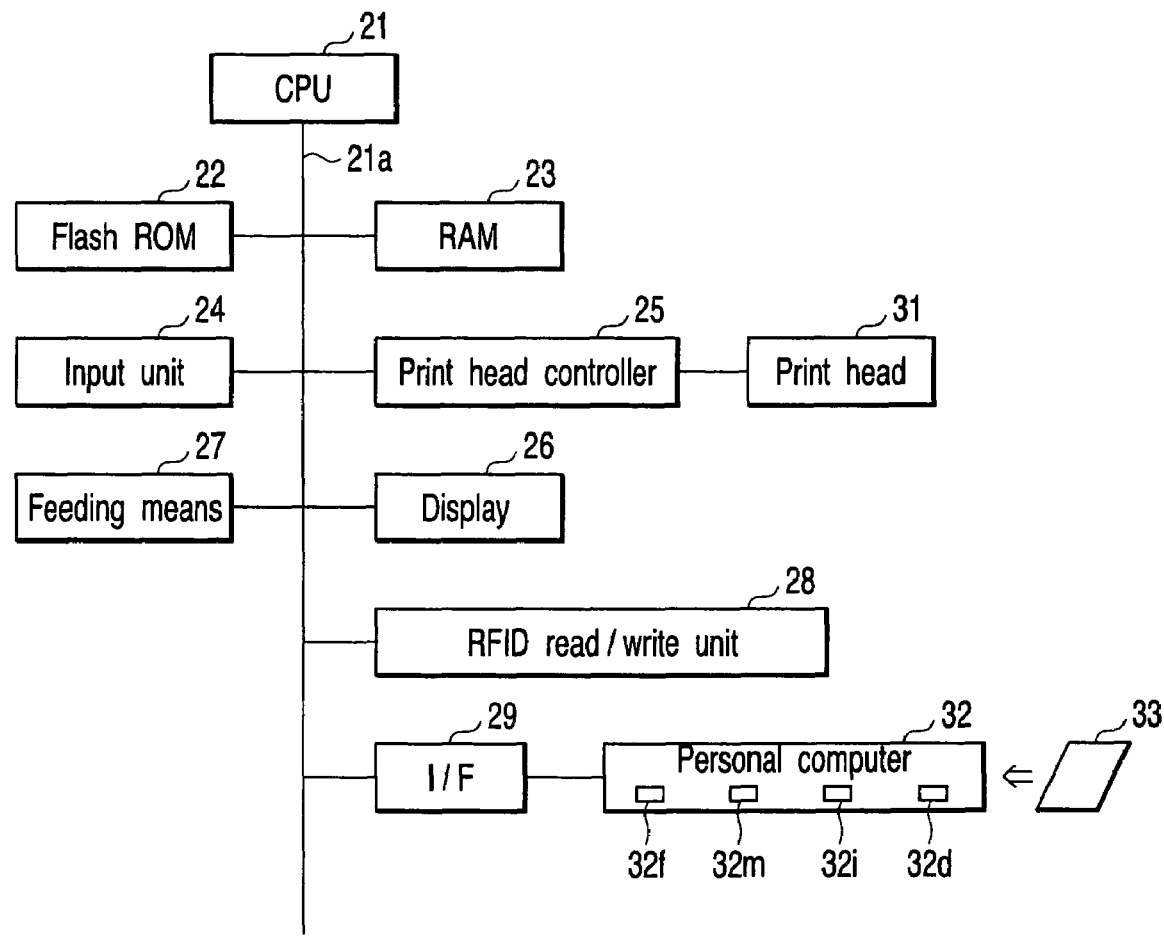
FIG. 1 is a block diagram of the configuration of a printer having an RFID read/write function according to an embodiment of the present invention.

In FIG. 1, a reference numeral 21 denotes a CPU (Central Processing Unit) to perform centralized control of the printer. A system bus 21a from the CPU 21 is connected to a flash ROM (Read Only Memory) 22, a RAM (Random Access Memory) 23, an input unit 24, a print head controller 25, a display 26, a feeding means 27, an RFID read/write unit 28, and an interface 29.

A print head 31 is connected to the print controller 25. The interface 29 is connected to a personal computer 32. The interface 29 serves as a means of taking in a feed amount described later. The configuration of the personal computer 32 is well known, and detailed explanation will be omitted. The personal computer 32 has a flash ROM 32f, a RAM 32m, a display 32d, and input unit 32i. The operator can instruct to issue a label or tag from the input unit 21i.

The flash ROM 22 stores various control programs necessary for operating the printer.

The RAM 23 ensures a work area used by the various control programs.

The print head controller 25 outputs a driving signal to the print head 31 composed of a thermal head, for example.

The display 26 is composed of a liquid crystal display, for example.

The feeding means 27 is composed of a stepping motor, a platen 42 and a feeding roller, which feed the liner 11.

Figure 2:
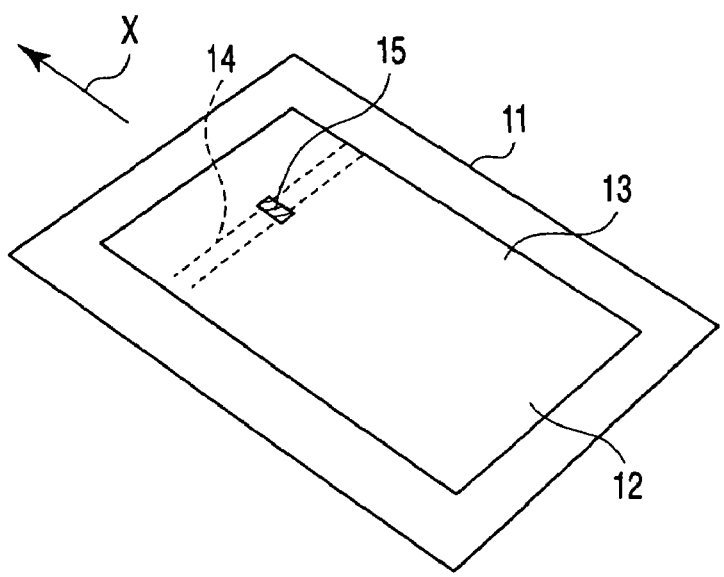
FIG. 2 is a view showing an RFID label according to the same embodiment.

Next, kinds of RFID will be explained with reference to FIG. 2 and FIG. 3. The RFID tag of FIG. 2 is as explained in the prior art.

The configuration of the RFID tag of FIG. 3 will be explained. In FIG. 3, the same numbers are given to the same components of FIG. 2, and detailed explanation will be omitted. The RFID tag shown in FIG. 3 is buried in the upstream of the RFID tag of FIG. 2 in the feeding direction (indicated by the arrow X).

Next, explanation will be given on the essential part of the configuration of the printer having the RFID read/write function with reference to FIG. 4.

Figure 4:
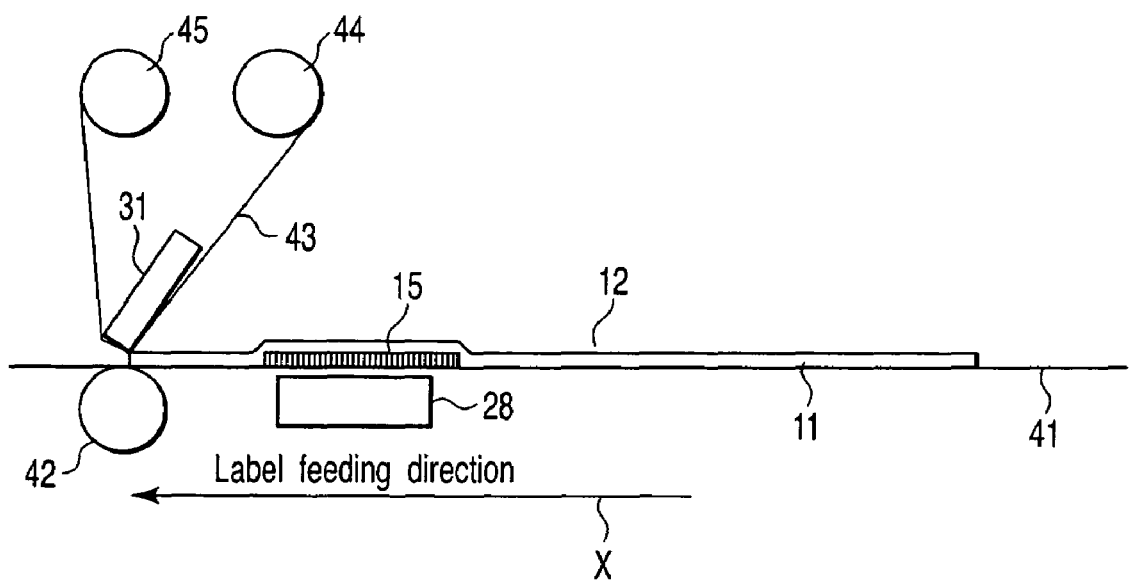
FIG. 4 is a view showing the configuration of the RFID label of FIG. 2.

In FIG. 4, a reference numeral 41 denotes a feeding path to feed the liner 11. The liner 11 is fed on the feeding path 41 by the feeding means 27.

A reference numeral 42 denotes a platen. The RFID read/write unit 28 is provided on the upstream of the platen 42.

The print head 31 is placed opposite to the platen 42 through the feeding path 41.

On the upstream of the print head 31, a supply roller 44 to supply an ink ribbon 43 is provided. On the downstream of the print head 31, a take-up roller 45 to take up the ink ribbon 43 is provided.

FIG. 4 shows the position of the RFID tag of FIG. 2 when the print head 31 comes to the home position. In the RFID tag 13 of FIG. 2, the RFID antenna 14 and RFID chip 15 are buried close to the print head 31 in the label 12. Therefore, the RFID antenna 14 and RFID chip 15 are placed substantially over the RFID read/write unit 28.

Figure 3:
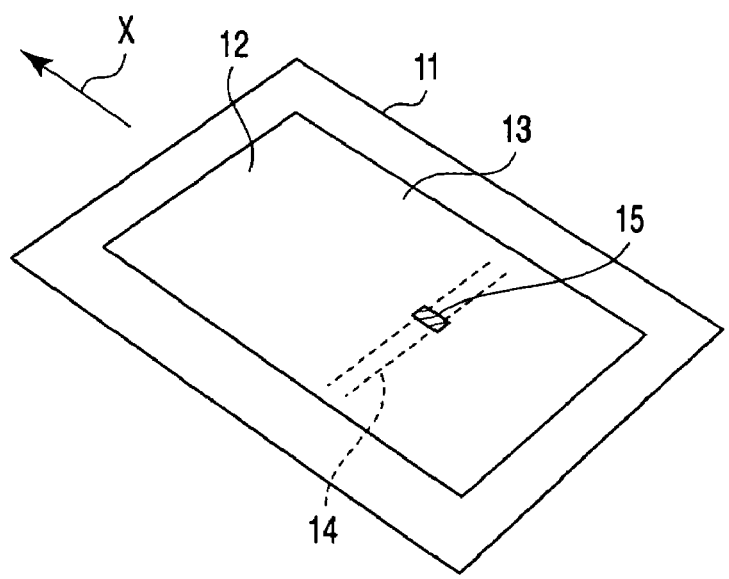
FIG. 3 is a view showing another RFID label according to the same embodiment.
Figure 5:
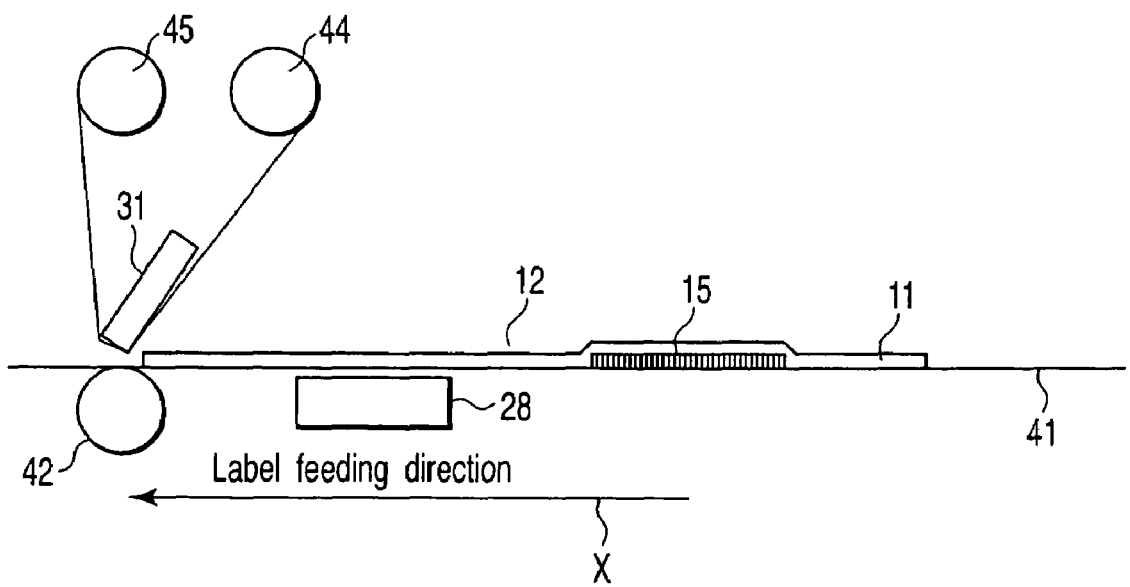
FIG. 5 is a view showing the configuration of the RFID label of FIG. 3.

FIG. 5 shows the position of the RFID tag of FIG. 3 when the print head 31 comes to the home position. In the RFID tag 13 of FIG. 3, the RFID antenna 14 and RFID chip 15 are buried in the upstream of the RFID tag of FIG. 2 in the feeding direction (indicated by the arrow X). Therefore, the RFID antenna 14 and RFID chip 15 are buried in the upstream of the RFID read/write unit in the feeding direction (indicated by the arrow X).

Figure 6:
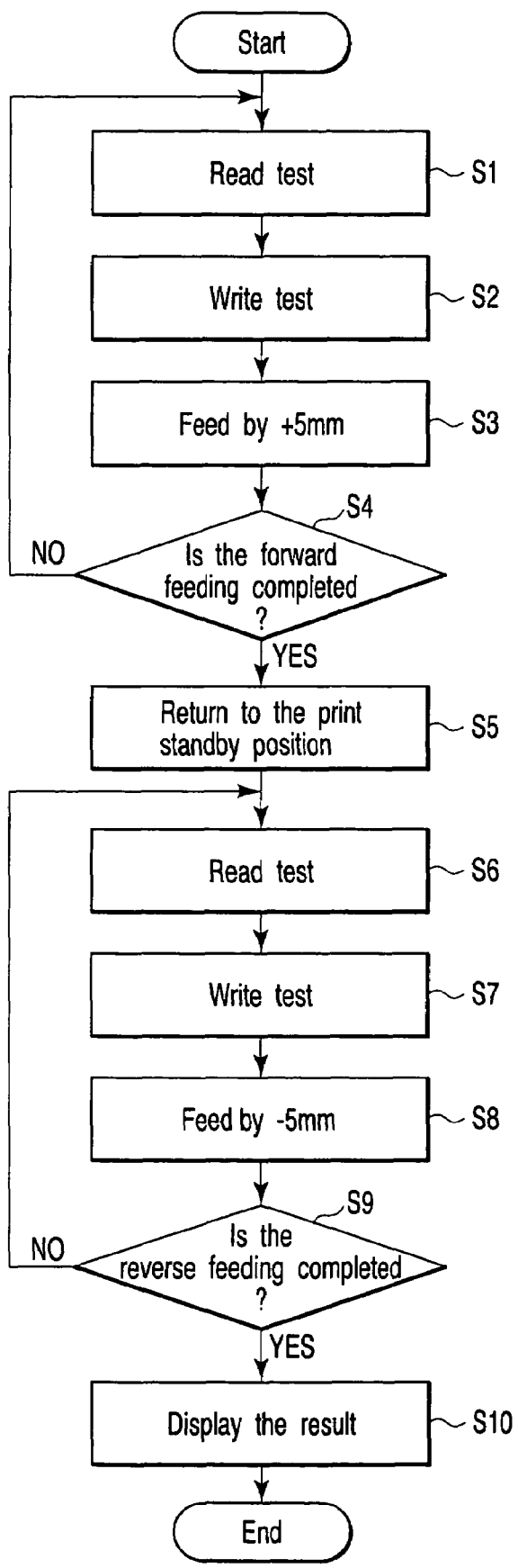
FIG. 6 is a flowchart for explaining the operation of the same embodiment.

Next, explanation will be given on the operation of an embodiment of the invention with reference to the flowchart of FIG. 6. A program for performing the operation shown in the flowchart of FIG. 6 is stored in a recording medium 33 (e.g., CD-ROM) readable by a computer. The program stored in the recording medium 33 is downloaded into the flash ROM 32f of the personal computer 32.

First, a read test is performed at the print standby position shown in FIG. 4 (step S1). The read test is a judgment whether specified data stored in the RFID chip 15 can be successfully read or not.

The result of the read test is stored in the memory 32m of the personal computer 32.

Then, a write test is performed (step S2). The write test is a judgment which judges that data is successfully written when the RFID read/write unit 28a receives a signal, which means that data is written to the RFID chip 15, from the RFID chip 15.

The result of the read test is stored in the memory 32m of the personal computer 32.

Then, the feeding means 27 feeds the label 12 by +5 mm forward, that is, toward the print head 31 (step S3). "+" means the feeding direction indicated by the arrow X shown in FIG. 4.

Whether the forward feeding is completed is judged (step S4). The feed amount is determined by considering the characteristic of the stepping motor composing the feeding means 27.

When NO in step S4, the operations on and after S1 are repeated. Namely, until the forward feeding is completed, the operations to read and write the data from/in the RFID chip 15 are repeated.

In this embodiment, the operations to read and write the data in the forward direction are repeated by 100 times.

When YES in step S5, the feeding means 27 feeds the label 12 in the reverse direction to return to the print standby position (step S4).

At the print standby position, the read test is performed (step S6). And then, the write test is performed (step S7).

Then, the feeding means 27 feeds the label 12 by 5 mm in the direction reverse to the print head 31, that is, by −5 mm.

Then, whether the reverse feeding is completed is judged (step S9). Until YES is judged in step S9, the operations of steps S6-S8 are repeated. In this embodiment, the read and write tests in the reverse direction are repeated by 100 times. The results of the tests are stored in the memory 32m of the personal computer 32.

Figure 7:
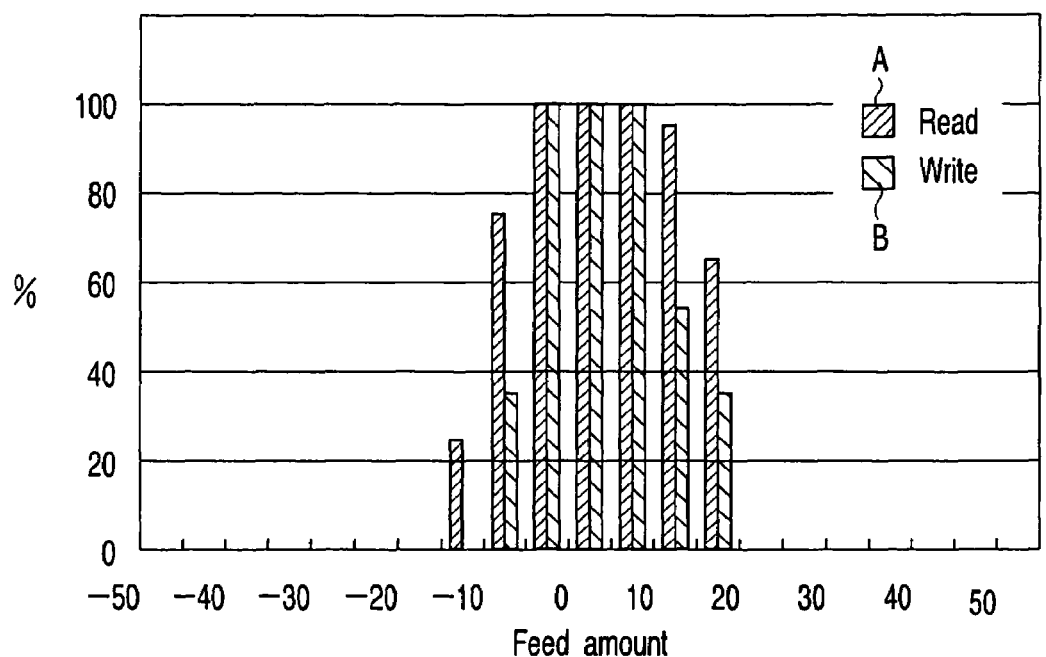
FIG. 7 is a graph for explaining the operation of the same embodiment.

When YES is judged in step S9, the test results of the tests are displayed in the display 32d as shown in FIG. 7.

Next, explanation will be given on the results of the tests displayed in the display 32d of the personal computer 32 with referent to FIG. 7. In FIG. 7, a sign A indicates the read test, and a sign B indicates the write test.

As shown in FIG. 7, the reading and writing are 100% successful in the feed amount 0-10. When the feed amount is increased to 15 and 20, the reading and writing are not 100% successful.

When the feed amount is decreased to −5 to −10, the reading and writing are 100% unsuccessful.

It is seen from FIG. 2 that when the feed amount is close to 0, the reading and writing are 100% successful. Therefore, an optimum feed amount is set to 0.

Because, when the RFID tag 13 is at the print standby position, the RFID chip 15 is placed over the RFID read/write unit 28.

Figure 8:
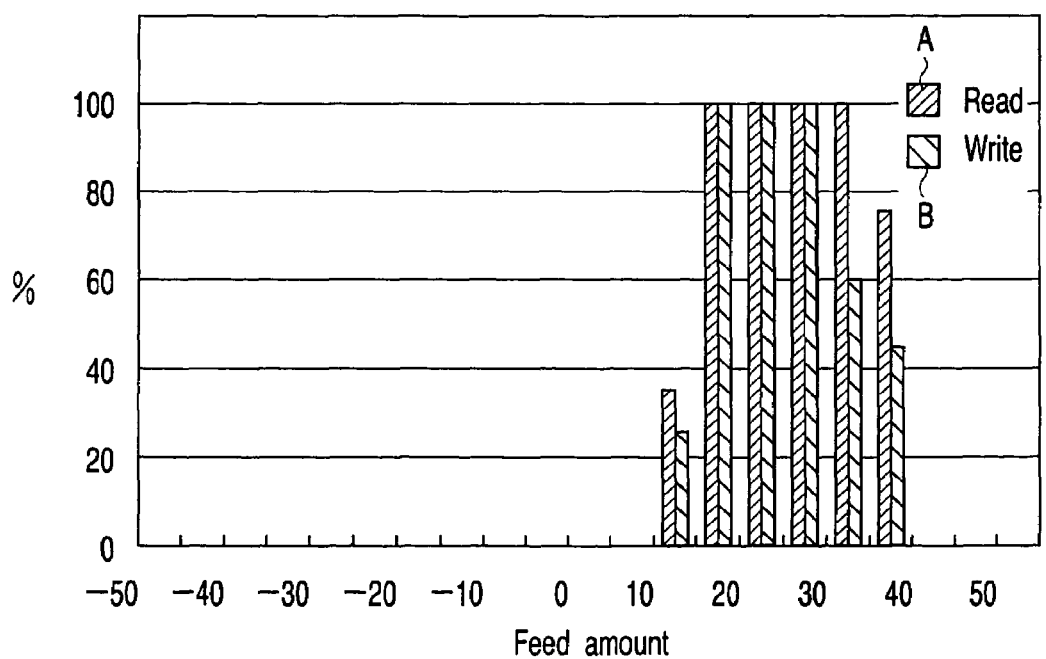
FIG. 8 is another graph for explaining the operation of the same embodiment.

FIG. 8 shows the state that the results of similar tests performed by using the RFID tag shown in FIG. 3 are displayed in the display of the personal computer 32.

As seen from this graph, when the feed amount is in a range of +20 to +30, the reading and writing are 100% successful. In this case, an optimum feed amount may be set to +25.

As explained above, by loading the programs for performing the operations shown in the flowchart of FIG. 6 in the personal computer 32, an optimum feed amount of the printer can be obtained.

It is also permitted to store an optimum feed amount in the RAM 32m of the personal computer 32. The apparatus may be so configured that when an issue command is entered from the personal computer 32, the personal computer 32 sends the command to the printer through the interface 29. Receiving the command, the printer feeds the label or tag according to the feed amount, and performs printing (an issuing means).

In the embodiment described above, the programs for performing the operations of the flowchart of FIG. 6 are loaded in the personal computer 32. The programs for performing the operations of the flowchart of FIG. 6 may be loaded in the flash ROM 22.

Further, although the test result is displayed in the display 32d of the personal computer 32, the result may be displayed in the display 26 of the printer or may be printed on the label 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A program stored in a medium readable by a computer for measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;
performing a read test and a write test each time the label or the tag is fed by the fixed amount;
returning the label or the tag to the print standby position when the feeding in the forward direction is completed;
feeding the label or the tag from the print standby position in a reverse direction in increments of the fixed amount;
performing the read test and the write test each time the label or the tag is fed by the fixed amount; and
displaying results of the tests when the feeding in the reverse direction is completed.

2. The program stored in a medium readable by a computer according to claim 1, wherein testing the RFID tag for reading is judgment whether specified data stored in the tag can be successfully read or not and testing the RFID tag for writing is a judgment which judges that data is successfully written when receiving a signal, which means that data is written to the RFID tag, from the RFID tag.

3. A program stored in a medium readable by a computer for measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;
performing a read test each time the label or the tag is fed by the fixed amount;
returning the label or the tag to the print standby position when the feeding in the forward direction is completed;
feeding the label or the tag from the print standby position in a reverse direction in increments of the fixed amount;
performing the read test each time the label or the tag is fed by the fixed amount; and
displaying results of the tests when the feeding in the reverse direction is completed.

4. The program stored in a medium readable by a computer according to claim 3, wherein testing the RFID tag for reading is judgment whether specified data stored in the tag can be successfully read or not.

5. A program stored in a medium readable by a computer for measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;
performing a write test each time the label or the tag is fed by the fixed amount;
returning the label or the tag to the print standby position when the feeding in the forward direction is completed;
feeding the label or the tag from the print standby position in a reverse direction in increments of the fixed amount;
performing the write test each time the label or the tag is fed by the fixed amount; and
displaying results of the tests when the feeding in the reverse direction is completed.

6. The program stored in a medium readable by a computer according to claim 5, wherein testing the RFID tag for writing is a judgment which judges that data is successfully written when receiving a signal, which means that data is written to the RFID tag, from the RFID tag.

7. A method of measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;
performing a read test and a write test each time the label or the tag is fed by the fixed amount;
returning the label or the tag to the print standby position when the feeding in the forward direction is completed;
feeding the label or the tag from the print standby position in a reverse direction in increments of the fixed amount;
performing the read test and the write test each time the label or the tag is fed by the fixed amount; and
displaying results of the tests when the feeding in the reverse direction is completed.

8. The method according to claim 7, wherein testing the RFID tag for reading is judgment whether specified data stored in the tag can be successfully read or not and testing the RFID tag for writing is a judgment which judges that data is successfully written when receiving a signal, which means that data is written to the RFID tag, from the RFID tag.

9. A method of measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;
performing a read test each time the label or the tag is fed by the fixed amount;
returning the label or the tag to the print standby position when the feeding in the forward direction is completed;
feeding the label or the tag from the print standby position in a reverse direction in increments of the fixed amount;
performing the read test each time the label or the tag is fed by the fixed amount; and
displaying results of the tests when the feeding in the reverse direction is completed.

10. The method according to claim 9, wherein testing the RFID tag for reading is judgment whether specified data stored in the tag can be successfully read or not.

11. A method of measuring an optimum feed amount to an RFID antenna from a print standby position of a printer which reads and writes data from/on an RFID tag by feeding a label or tag containing an RFID tag, and then prints on the label surface by feeding the label or tag in the reverse direction, comprising:

feeding the label or the tag from the print standby position in a forward direction in increments of a fixed amount;

performing a write test each time the label or the tag is fed by the fixed amount;

returning the label or the tag to the print standby position when the feeding in the forward direction is completed;

feeding the label or the tag from the print standby position in a reverse direction in increments of the fixed amount;

performing the write test each time the label or the tag is fed by the fixed amount; and displaying results of the tests when the feeding in the reverse direction is completed.

12. The method according to claim 11, wherein testing the RFID tag for writing is a judgment which judges that data is successfully written when receiving a signal, which means that data is written to the RFID tag, from the RFID tag.

13. A printer having an RFID read/write function to read/write an RFID tag of a label or tag containing an RFID tag, and print on the surface of the label or tag, comprising:

a feeding means configured to feed the label or the tag from a print standby position in a forward direction in increments of a fixed amount, and when the feeding in the forward direction is completed, return the label or the tag to the print standby position and feed the label or the tag from the print standby position in a reverse direction in increments of the fixed amount;

a test unit configured to perform a read test and a write test each time the label or the tag is fed by the fixed amount; and a display device configured to display results of the tests when the feeding in the reverse direction is completed.

14. The printer according to claim 13, wherein the test unit tests the RFID tag for reading is judgment whether specified data stored in the tag can be successfully read or not and tests the RFID tag for writing is a judgment which judges that data is successfully written when receiving a signal, which means that data is written to the RFID tag, from the RFID tag.

15. A printer having an RFID read/write function to read/write an RFID tag of a label or tag containing an RFID tag, and print on the surface of the label or tag, comprising:

a feeding means configured to feed the label or the tag from a print standby position in a forward direction in increments of a fixed amount, and when the feeding in the forward direction is completed, return the label or the tag to the print standby position and feed the label or the tag from the print standby position in a reverse direction in increments of the fixed amount;

a test unit configured to perform a read test each time the label or the tag is fed by the fixed amount; and a display device configured to display results of the tests when the feeding in the reverse direction is completed.

16. The printer according to claim 15, wherein the test unit tests the RFID tag for reading is judgment whether specified data stored in the tag can be successfully read or not.

17. A printer having an RFID read/write function to read/write an RFID tag of a label or tag containing an RFID tag, and print on the surface of the label or tag, comprising:

a feeding means configured to feed the label or the tag from a print standby position in a forward direction in increments of a fixed amount, and when the feeding in the forward direction is completed, return the label or the tag to the print standby position and feed the label or the tag from the print standby position in a reverse direction in increments of the fixed amount;

a test unit configured to perform a write test each time the label or the tag is fed by the fixed amount; and a display device configured to display results of the tests when the feeding in the reverse direction is completed.

18. The printer according to claim 17, wherein the test unit tests the RFID tag for writing is a judgment which judges that data is successfully written when receiving a signal, which means that data is written to the RFID tag, from the RFID tag.

* * * * *